United States Patent [19]

Imhoff

[11] 4,257,353
[45] Mar. 24, 1981

[54] DISPOSABLE PET DISH

[76] Inventor: Kathy S. Imhoff, 1609 Anita Lane, Newport Beach, Calif. 92660

[21] Appl. No.: 961,476

[22] Filed: Nov. 16, 1978

[51] Int. Cl.³ .................. A01K 5/00; B65D 25/16
[52] U.S. Cl. .................. 119/61; 206/515; 220/69; 220/401; 220/404; 220/410; 220/85 H; D30/16
[58] Field of Search .............. 220/69, 401, 404, 405, 220/85 H, 410; 206/515, 518, 519; D30/16; 119/61, 72

[56] References Cited

U.S. PATENT DOCUMENTS

| | | | |
|---|---|---|---|
| 983,473 | 2/1911 | Barnes | 220/85 H |
| 1,240,945 | 9/1917 | Clemens | 220/401 |
| 2,315,591 | 4/1946 | Carew | 220/405 |
| 2,366,584 | 1/1945 | Woodward | D30/16 |
| 2,584,301 | 2/1952 | Sinclair | 119/61 |
| 3,194,429 | 7/1965 | Bouet | 220/85 H |
| 3,527,192 | 9/1970 | Ferrara | 119/61 |

*Primary Examiner*—George E. Lowrance
*Attorney, Agent, or Firm*—Walter G. Finch

[57] ABSTRACT

The invention is a disposable pet dish for feeding and watering pets. The disposable dish is presented in several embodiments to stand alone or to fit a variety of support frame structures. Such support frame structures, as part of the invention, may be of a wire frame type structure or of a monolithic molded frame type structure. The disposable dish may be formed in several configurations to fit the support structures. The disposable pet dishes are easily transported when travelling and eliminate the need for constant washing. It is a sanitary approach to pet feeding, to keep an area clean so that insects, rodents, and other pests are kept under control, and to provide a simple effective means of controlling the eating habits of pets.

5 Claims, 8 Drawing Figures

DISPOSABLE PET DISH

BACKGROUND AND SUMMARY OF THE INVENTION

The invention relates to pet feeding and watering and in particular to pets in the home or close to the home and often taken on trips while travelling. Specifically, it relates to pets usually fed and watered at floor level from small dishes.

A need has existed for a quick, easy, and simple method for feeding and watering pets in the home and while travelling. A particular need is one that is sanitary and provides some means of controlling pests because of possible unsanitary conditions and also one that can control the eating habits of pets. This invention provides that type of pet feeding and watering means.

In and around the home pet feeding has always been a chore of feeding the pet or pets in a makeshift or special dish, then disposing of uneaten food, washing the dish, and other attendant chores. The present invention simplifies this chore.

An associated problem is that partially eaten food in the dish, or the remnants of food particles on the dish of a completely eaten meal, attract insects and rodents and other types of pests. In addition, it creates unpleasant odors. These problems exist because it is not always convenient to thoroughly wash the pet dishes to prevent such conditions. The present invention simplifies the control of these problems.

Another problem in pet feeding, particularly where pets are to be fed once per day or at specific times, is the need to take up the dishes at the time and go through the unpleasant task of cleaning and washing the pet dishes without delay. The present invention simplifies this task and means that the eating habits of the pet are easily controlled.

Still another problem is pet feeding while travelling. Pet dishes must be cleaned and washed in the most inconvenient places, often where such sanitary washing facilities are not readily available. This invention overcomes that problem in a very simple manner.

A simple support structure is provided in several embodiments for the disposable pet dish, which also may be made in several configurations.

It is, therefore, an object of the invention to provide a pet dish that simplifies the chore of feeding and watering pets by making it conveniently disposable to eliminate cleaning and washing.

It is also an object of the invention to provide a pet dish that when used provides an easy means of controlling insects, rodents, and other pests by being conveniently disposable.

Another object of the invention is to provide a pet dish that makes it convenient to dispose of it to control unpleasant odors.

Still another object of the invention is to provide a pet dish that can be disposed of easily so as to control the eating time and eating habits of the pets.

Yet another object of the invention is to provide a pet dish that can be disposed of easily while travelling and thus eliminate the need for cleaning and washing the pet dishes.

It is still yet another object of the invention to provide a disposable pet dish that is wholly self-contained.

It is a further object of the invention to provide a suitable support frame for holding an insert type disposable pet dish.

Further objects and advantages of the invention will become more apparent in light of the following description of the preferred embodiments.

DESCRIPTION OF THE PREFERRED EMBODIMENTS

Figure 1:
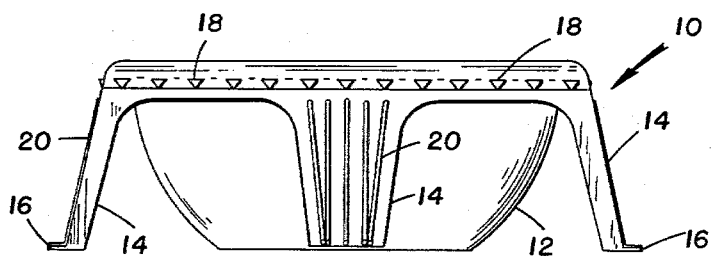
FIG. 1 is a side view of a first embodiment of a self-contained disposable pet dish.
Figure 2:
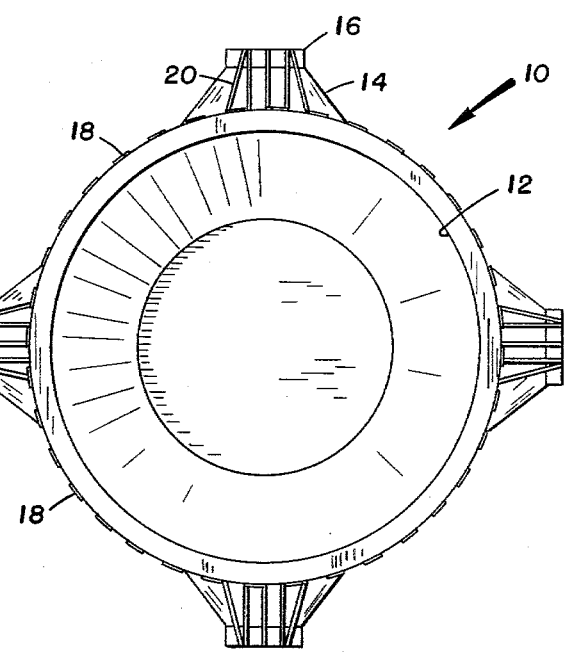
FIG. 2 is a top view of FIG. 1.
Figure 3:
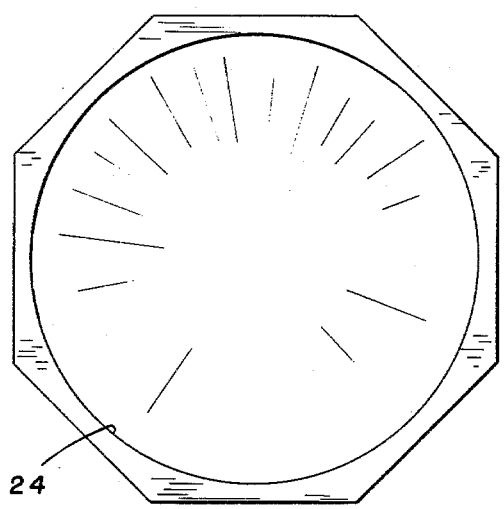
FIG. 3 is a top view of a second embodiment of a self-contained disposable pet dish.
Figure 4:
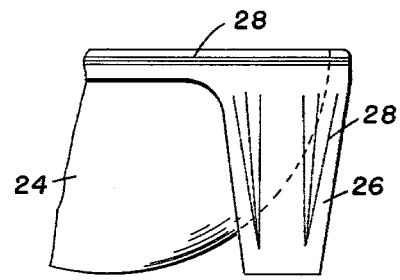
FIG. 4 is a partial side view of FIG. 3.

Referring to the drawings and particularly to FIGS. 1, 2, and 3, a self-contained disposable pet dish is shown as a first embodiment at 10 in FIGS. 1 and 2, and as a second embodiment at 22 in FIG. 3. A partial view of the second embodiment of the self-contained pet dish 22 is shown in FIG. 4.

In the first embodiment of the self-contained disposable pet dish 10, it is shown with as a round or circular configuration.

In the disposable pet dish 10, the bowl structure 12 is shown with four legs 14, having outwardly flanged feet 16. It is to be understood that a variation in the plurality of legs 14 or in the configuration of the feet 16, including the omission of feet 16, is within the scope and intent of this invention.

Decorative raised patterns 18 are optional additions to the rim of the disposable pet dish 10 and it is to be understood that variations in the design of decorative raised patterns 18, the location of such decorative patterns 18, or the elimination of such decorative patterns 18 is within the scope and intent of this invention.

Raised ribs 20 on legs 14 are both decorative and have a reinforcing strengthing effect. However, it is to be understood that such ribs 20 may be varied in design or location, or may be omitted and be within the scope and intent of this invention.

The self-contained disposable pet dish 10 is of very thin material and may be cardboard, treated cardboard for waterproofing, platicized cardboard, plastics, or any other suitable low-cost material that is easily disposed of in trash or refuse containers or devices without cleaning or washing. The configuration is such that multiple numbers of the self-contained disposable pet dish 10 may be stacked, stored or packed. The entire unit is disposed of when its one-time use is completed. This is not to say that some owners may elect to reuse the self-contained disposable pet dish 10 more than once, even though it defeats the general intent of the disposable feature of the pet dish 10. Such elected reuse is within the scope of the invention.

In the second embodiment of the self-contained disposable pet dish 22, the configuration is shown in FIG.

3 as octagonal. It is to be understood that any geometrical configuration of the self-contained disposable pet dish 10 or 22 is within the scope and intent of this invention.

A variation in the previously mentioned decorative and reinforcing features is shown for the self-contained disposable pet dish 22. Rib-type decorative features and reinforcements 28 are shown on the rim of the bowl structure 24. Rib-type decorative features and reinforcements 28 are also shown on the legs 26.

It is to be understood that the variation in configuration or elimination of these ribs 28 are within the scope and intent of the invention the same as provided for the self-contained disposable pet dish 10.

The self-contained disposable pet dish 22, like the pet dish 10, is also of very thin material and of the same type material as provided for pet dish 10. Likewise, the pet dish 22 has the same packing, storing and other similar features as pet dish 10, it being specifically a second embodiment.

A third embodiment of the disposable pet dish concept is a disposable insert 30 that is held in a support frame as hereinafter described in two embodiments.

The disposable insert 30 is shown in a round or circular configuration. It is to be understood that any other geometrical configuration is within the scope and intent of this invention.

Figure 5:
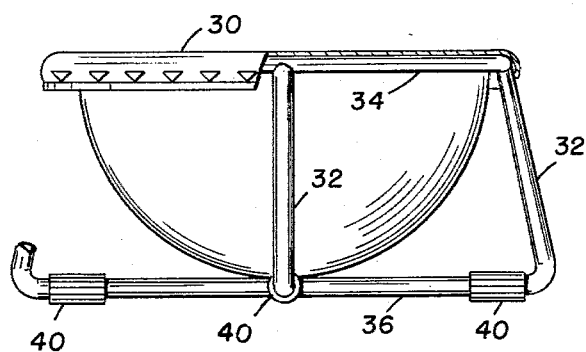
FIG. 5 is a side view of a first embodiment of a support frame showing a partial side view of a disposable pet dish insert.
Figure 6:
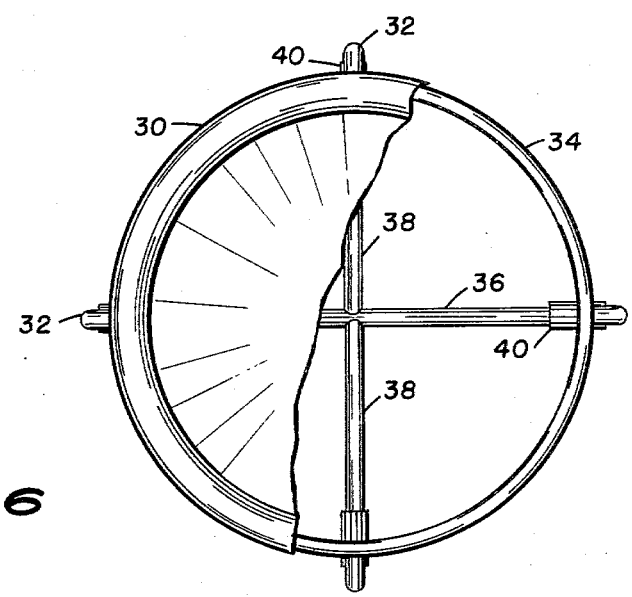
FIG. 6 is a top view of FIG. 5.
Figure 7:
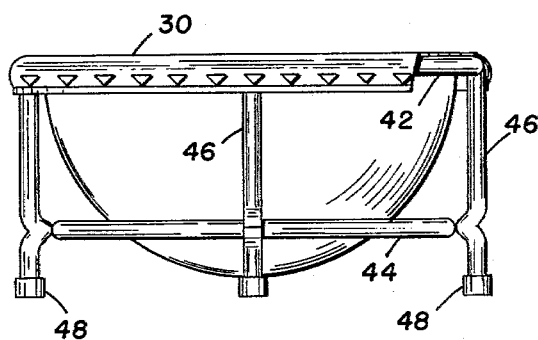
FIG. 7 is a side view of a second embodiment of a support frame showing a partial side view of a disposable pet dish insert.

The disposable insert 30 fits into and over a support frame having a top member 34, in FIGS. 5 and 6, or a top member 42 in FIG. 7. The disposable insert 30 may be made with a turned lip at the top edge to merely fit over the top member 34 or 42 or may be made with a turned lip at the upper edge to snap over the top member 34 or 42 in order to hold it firmly while the pet eats or drinks from the disposable insert 30 as a pet dish. It is to be understood that whether the disposable insert 30 merely fits over or snaps into place over the top member 34 or 42 is within the scope and intent of this invention.

Decorative features, unnumbered, are shown on the rim of the disposable insert 30. These, like those in pet dishes 10 and 22, are optional. However, in addition to the configuration of the rim lip of the disposable insert 30 being one method of providing a snap-fit over the top member 34 or 42, the decorative pattern may be used to give a dimple effect to provide the snap-fit action. Such a variation is within the scope and intent of this invention.

Of the two embodiments of a support frame, one shown in FIGS. 5 and 6, and one shown in FIG. 7, both essentially function in a similar manner.

In FIGS. 5 and 6 the support frame consists of a single circular-like top member 34 supported by a U-type leg 36 into which two half-sections 38 of a similar U-type leg design are fitted and suitably joined. The vertically rising portion of the U-type leg is shown as 32 for both legs 36 and 38.

In FIGS. 5 and 6 the first embodiment of the support frame consists of a single circular-like top member 34 supported by a first U-type leg arrangement having more or less vertical members 32 and a horizontal bottom member 36 which is monolithic with the vertical members 32; and at right angles to the first U-type leg arrangement is a second U-type leg arrangement with similar more or less vertical members 32 monolithically connected to horizontal members 38 which fit into and are suitably joined or connected to the horizontal member 36 to form the second U-type leg arrangement.

It is to be understood that any variation in the arrangement or configuration of the leg arrangement, or in the plurality of such structural features is within the scope and intent of this invention.

The joining or fastening of top member 34 to vertically standing members 32, and the joining or fastening together of horizontal members 36 and 38 to form the support frame may be by welding, brazing, adhesives, or other suitable method. Such variations in joining or fastening means are within the scope and intent of this invention.

In FIG. 7 the second embodiment of the support frame consists of a top member 42, similar to top member 34 in the first embodiment, supported by a plurality of vertical legs 46, said legs 46 being supported and braced near the lower end by a bottom member 44.

Like the first embodiment, the parts of the second embodiment are similarly fastened to each other.

Both embodiments of the support frame have rubber feet to steady the frame on the floor or other surface upon which it rests. The rubber feet 40 are shown in the first embodiment as short lengths of hose-like tubing surrounding the horizontal members 36 and 38. The hose-like tubing rubber feet 40 may be slipped on to the support members 36 and 38 before assembly, or split and slipped over the support members 36 and 38 after assembly. In the second embodiment the rubber feet 48 are shown as rubber cup-like caps on the bottom of the legs 46.

It is to be understood that the rubber feet 40 and 48 may be any rubber like material, plastics material, or other suitable material providing a similar service.

Figure 8:
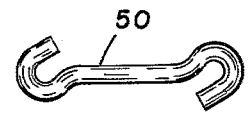
FIG. 8 is a hook for connecting two support frames together.

A double hook-type connector 50 in FIG. 8 is provided for hooking two support frames together side by side. This may be desirable by a pet owner to provide one disposable pet dish for food and one for water. The connector 50 may be merely snapped on to legs 32 or 46 of two adjacent support frames, or the hooked ends of the connector 50 may be closed to permanently connect the two support frames together.

The connector 50 may be metal, plastics, or other suitable material. The members for the support frames may be metal, plastics, or other suitable materials in rod of various configurations, tube, bar stock, or other material forms.

Thus, by this invention, a disposable pet dish is provided in self-contained form in several embodiments and in a third embodiment as a disposable insert held in a support frame.

Accordingly, modifications and variations to which the invention is susceptible may be practiced without departing from the scope and intent of the appended claims.

What is claimed is:

1. A disposable pet dish comprising:
a bowl-like member, said bowl-like member being of very thin disposable material, said bowl-like member being a turned lip at the upper edge thereof, said bowl-like member and said turned lip being monolithically molded of one piece; and
a support frame, said support frame being configured so that said bowl-like member may be placed therein, said support frame having a top member of a configuration to surround and fit said bowl-like member, said top member being of a cross-sectional configuration to fit into said turned lip at the upper edge of said bowl-like member, said turned lip snapping into place over said top member, said support frame having a plurality of leg member affixed to said top member to support said top member with the bowl-like member thereon, said support frame having a system of cross-brace members affixed to said plurality of leg members.

2. The pet dish as recited in claim 1, wherein said plurality of leg members are interconnected with each other as a support brace, said interconnection of said leg members being achieved by a continuation of each said leg member by bending each said leg member inwardly and passing under said bowl-like member situated within and affixed to said top member, said bent leg members being flushly joined at the point of interface with each other under said bowl-like member.

3. The pet dish as recited in claim 1, wherein said plurality of leg members are interconnected with each other as a support brace, a continuous brace member, said interconnection of said leg members being achieved by said continuous brace member encircling said bowl-like member and spaced therefrom, said continuous brace member being affixed to the inward facing exterior surface of each said leg member, said continuous brace member being spaced between said top member and the lower extremities of said leg members.

4. The pet dish as recited in claim 1, wherein said support frame has rubber-like feet on the lowest frame members thereof that rest on a floor-like surface.

5. The pet dish as recited in claim 1, and additionally decorative dimples in said turned lip at the upper edge of said bowl-like member, said decorative dimples providing the snapfit holding means for said turned lip snapping into place over said top member.

* * * * *